United States Patent
Yamanaka et al.

(10) Patent No.: US 9,605,944 B2
(45) Date of Patent: Mar. 28, 2017

(54) DISTANCE MEASURING DEVICE AND DISTANCE MEASURING METHOD

(71) Applicants: Yuji Yamanaka, Kanagawa (JP); Kensuke Masuda, Kanagawa (JP)

(72) Inventors: Yuji Yamanaka, Kanagawa (JP); Kensuke Masuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 293 days.

(21) Appl. No.: 13/770,180

(22) Filed: Feb. 19, 2013

(65) Prior Publication Data
US 2013/0222577 A1 Aug. 29, 2013

(30) Foreign Application Priority Data

Feb. 24, 2012 (JP) ................................. 2012-038890
Nov. 1, 2012 (JP) ................................. 2012-241843

(51) Int. Cl.
| | | |
|---|---|---|
| *G01B 11/02* | (2006.01) | |
| *G01C 3/06* | (2006.01) | |
| *G02B 7/28* | (2006.01) | |
| *G02B 7/34* | (2006.01) | |
| *G02B 7/36* | (2006.01) | |
| *H04N 5/357* | (2011.01) | |

(52) U.S. Cl.
CPC ............. *G01B 11/026* (2013.01); *G01C 3/06* (2013.01)

(58) Field of Classification Search
CPC .......... G01B 11/026; G02B 7/28; G02B 7/36; G02B 19/00
See application file for complete search history.

(56) References Cited

U.S. PATENT DOCUMENTS

| 5,076,687 A * | 12/1991 | Adelson | G01C 3/08 |
| | | | 250/201.7 |
| 5,315,341 A * | 5/1994 | Hibbard | G02B 7/34 |
| | | | 396/61 |
| 2005/0141392 A1* | 6/2005 | Kitahara | G11B 7/1367 |
| | | | 369/112.05 |

(Continued)

FOREIGN PATENT DOCUMENTS

| JP | 2009-229125 | 10/2009 |
| JP | 2009-300268 A | 12/2009 |

(Continued)

OTHER PUBLICATIONS

Office Action issued Mar. 11, 2015, in Chinese Patent Application 201310375817.2 (with English translation).

(Continued)

*Primary Examiner* — Obafemi Sosanya
(74) *Attorney, Agent, or Firm* — Oblon, McClelland, Maier & Neustadt, L.L.P.

(57) ABSTRACT

Disclosed is a distance measuring device including an imaging lens configured to condense incident light from an object, a lens array configured in such a manner that light having passed through the imaging lens is incident thereon, an imaging element array configured to receive light having passed through the lens array to output image information, and a distance calculating part configured to calculate a distance to the object based on the image information, wherein the lens array includes plural lenses with different numeric apertures.

10 Claims, 12 Drawing Sheets

(56) References Cited

U.S. PATENT DOCUMENTS

| | | | |
|---|---|---|---|
| 2006/0002604 A1* | 1/2006 | Sakai | G06T 7/001 |
| | | | 382/141 |
| 2008/0014685 A1* | 1/2008 | Govorkov et al. | 438/150 |
| 2008/0218611 A1* | 9/2008 | Parulski | H04N 5/2258 |
| | | | 348/262 |
| 2008/0252988 A1* | 10/2008 | Tormen | B81C 99/0085 |
| | | | 359/652 |
| 2009/0167922 A1* | 7/2009 | Perlman | H04N 5/357 |
| | | | 348/340 |
| 2010/0053565 A1* | 3/2010 | Mizushima | G02B 3/0006 |
| | | | 353/38 |
| 2011/0300490 A1* | 12/2011 | Rachet et al. | 430/322 |

FOREIGN PATENT DOCUMENTS

| JP | 2011-095027 A | 5/2011 |
|---|---|---|
| JP | 2013-157780 A | 8/2013 |

OTHER PUBLICATIONS

Japanese Office Action issued in Application No. 2012-241843 on Aug. 9, 2015.

\* cited by examiner

DISTANCE MEASURING DEVICE AND DISTANCE MEASURING METHOD

BACKGROUND OF THE INVENTION

1. Field of the Invention

An aspect of the present invention relates to at least one of a distance measuring device and a distance measuring method.

2. Description of the Related Art

Conventionally, a distance measuring device such as a stereoscopic camera has been known for measuring a distance to an object by inputting plural two-dimensional images at different points of view. For example, a distance measuring device has been known which includes an image sensor camera, an image capturing board, a memory for storing image data, an image processing part for calculating information of a distance to an object from the image data stored in the memory, and a display monitor for displaying information of a distance calculated in the image processing part.

In the above-mentioned distance measuring device, the image processing part is composed of a reconstruction part, a brightness information calculating part, a distance information calculating part, and a mask part. The mask part converts a value of a picture element corresponding to a non-lens part of a micro-lens array inside the image sensor camera to a predetermined value.

However, properties of lenses constituting a micro-lens array in the above-mentioned distance measuring device are uniform, and hence, "blown out highlights" (overexposure) or "blocked up shadows" (underexposure) may be caused in a scene with a large brightness difference, wherein information for calculating a distance to an object may lack in such an area, and hence, there may be a problem that it may not be possible to measure a distance at a good precision.

SUMMARY OF THE INVENTION

According to one aspect of the present invention, there is provided a distance measuring device including an imaging lens configured to condense incident light from an object, a lens array configured in such a manner that light having passed through the imaging lens is incident thereon, an imaging element array configured to receive light having passed through the lens array to output image information, and a distance calculating part configured to calculate a distance to the object based on the image information, wherein the lens array includes plural lenses with different numeric apertures.

According to another aspect of the present invention, there is provided a distance measuring method including a step of receiving incident light from an object on an imaging element array via a lens array including plural lenses with different numerical apertures to output image information, and a step of calculating a distance to the object based on the image information.

DETAILED DESCRIPTION OF THE PREFERRED EMBODIMENTS

Figure 1:
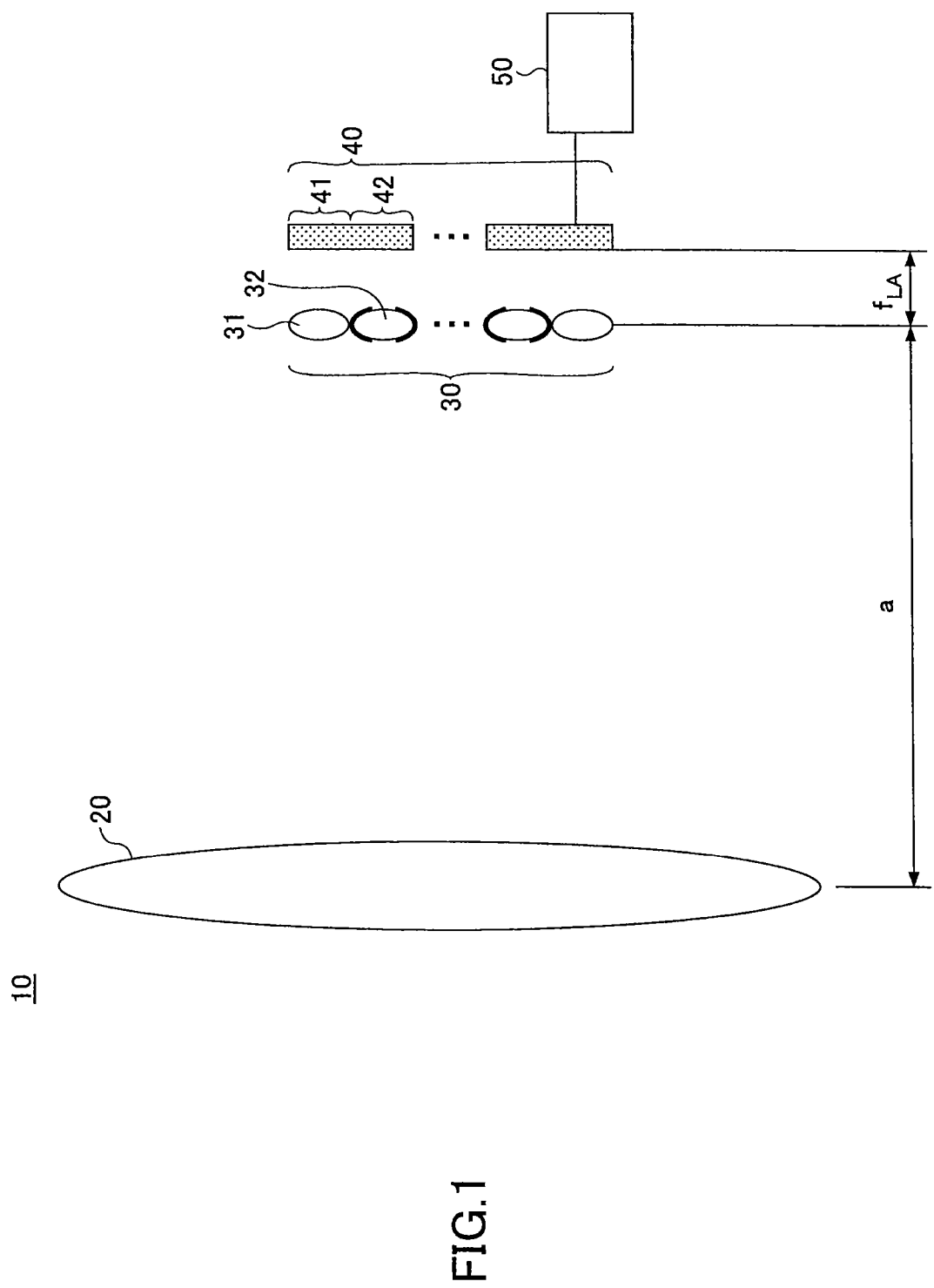
FIG. 1 is a diagram illustrating a distance measuring device according to a first embodiment.

Some embodiments of the invention will be described with reference to the drawings below. In each figure, an identical component is provided with an identical reference numeral and a repeated description thereof may be omitted.

A First Embodiment

FIG. 1 is a diagram illustrating a distance measuring device according to a first embodiment. As referring to FIG. 1, a distance measuring device 10 has an imaging lens 20, a lens array 30, an imaging element array 40, and a distance calculating part 50. The lens array 30 has lenses with plural aperture radii which include a lens 31 with a predetermined aperture radius and a lens 32 with an aperture radius smaller than that of the lens 31.

In the distance measuring device 10, $f_{ML}$ is a focal length of the imaging lens 20 and $f_{LA}$ is a focal length of each of the lenses 31 and 32 which constitute the lens array 30. Furthermore, a is a distance between a central part of the imaging lens 20 and a central part of the lens array 30, wherein a distance between a central part of the lens array 30 and a surface of the imaging element array is $f_{LA}$.

The imaging lens 20 has a function for condensing, and imaging at a position of the lens array 30, incident light from an object. Each of the lenses 31 and 32 which constitute the lens array 30 has a function for diverging again, and transmitting to the imaging element array 40, converged light rays which have passed through the imaging lens 20.

Each imaging element which constitutes the imaging element array 40 has a function for converting incident light to an electric signal to output image information (a light field image). For the imaging element array 40, it may be possible to use, for example, a Metal Oxide Semiconductor (MOS) device or a Complimentary Metal Oxide Semiconductor (CMOS) device. For the imaging element array 40, a Charge Coupled Device (CCD), a Contact Image Sensor (CIS), etc., may be used.

The distance calculating part 50 has a function for processing a light field image outputted from the imaging element array 40, and for example, calculating a distance from an object. The distance calculating part 50 includes, for example, a Central Processing Unit (CPU), a Read-Only Memory (ROM), a main memory, etc., wherein a program recorded in such a ROM, etc., is read out into such a main memory and executed by such a CPU so that it may be possible to attain each kind of function of the distance calculating part 50. However, a part or all of the distance calculating part 50 may be attained by only hardware. Alternatively, the distance calculating part 50 may be physically composed of plural devices.

The distance measuring device 10 is provided with a configuration as illustrated in FIG. 1, so that it may be possible to construct a plenoptic camera capable of obtaining a light field image with a wide dynamic range. Additionally, a plenoptic camera is a camera capable of obtaining images at different points of view in a single imaging by dividing light incident on the camera due to micro-lenses. Hence, calculation processing is conducted based on an image which has been imaged by a plenoptic camera, so that it may be possible to produce an image at an arbitrary point of view, aperture radius, and focusing distance.

Each component of the distance measuring device 10 will be described in more detail below. In the distance measuring device 10, a numerical aperture of the imaging lens 20 and a numerical aperture of the lens 31 which constitutes the lens array 30 are provided as being equal values NAa and a numerical aperture of the lens 32 is provided as being a value Nab smaller than NAa. That is, the lens 32 is a lens slower than the lens 31.

For example, lenses with mutually equal curvatures are used for the lens 31 and the lens 32 and a portion of an aperture part of the lens 32 is masked (shielded), so that it may be possible to provide a numerical aperture of the lens 32 smaller than a numerical aperture of the lens 31. For example, it may be possible to form an opaque metal film on a portion of an aperture part of the lens 32 so as to provide a mask (shield). For a material of an opaque metal film, it may be possible to use, for example, chromium (Cr), aluminum (Al), etc., which may be difficult to be oxidized. Additionally, the lens 31 is one typical example of a first lens according to an embodiment of the present invention and the lens 32 is one typical example of a second lens according to an embodiment of the present invention.

In each imaging element of the imaging element array 40, an image directly below a fast lens 31 and an image directly below a slow lens 32 are referred to as a macro-pixel 41 and a macro-pixel 42, respectively. Each of the macro-pixels 41 and 42 is composed of plural light-receiving elements. One micro-pixel 41 is composed of, for example, two horizontal picture elements×two vertical picture elements. Similarly, one macro-pixel 42 is composed of, for example, two horizontal picture elements×two vertical picture elements.

A difference as described below is produced between images received by the macro-pixel 41 and macro-pixel 42. That is, the macro-pixel 41 is an image provided by the fast lens 31, and hence, blocked up shadows may not be produced even when an object is dark. Furthermore, the macro-pixel 42 is an image provided by the slow lens 32, and hence, blown out highlights may not be produced even when an object is bright, so that it may be possible to obtain an image with a tone.

Figure 2A:
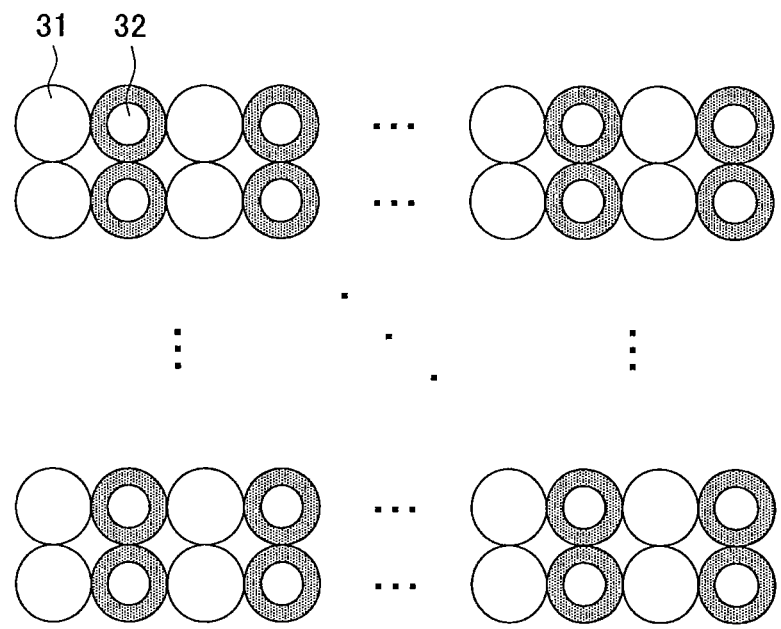
FIG. 2A and FIG. 2B are diagrams illustrating arrangement of fast lenses and slow lenses which constitute a lens array according to a first embodiment.
Figure 2B:
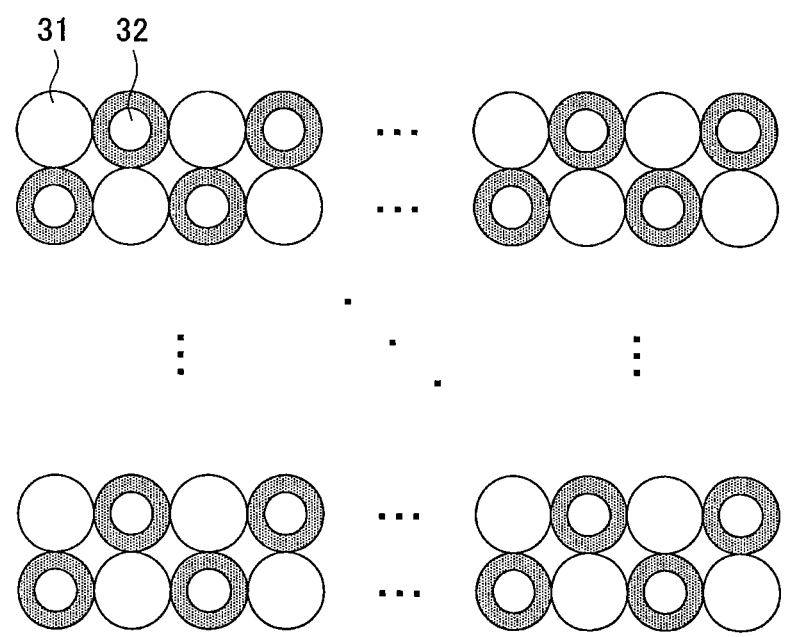

Next, arrangement of the fast lenses 31 and the slow lenses 32 which constitute the lens array 30 will be described. FIG. 2A and FIG. 2B are diagrams illustrating arrangement of fast lenses and slow lenses which constitute a lens array according to the first embodiment, and diagrams when viewed from a direction of incident light. For the lenses 31 and the lenses 32, for example, a sequence of the lenses 31 and a sequence of the lenses 32 may be alternately arrayed as illustrated in FIG. 2A, or lenses 31 and lenses 32 may be arrayed in a checkerboard pattern as illustrated in FIG. 2B. Of course, a row and a column may be exchanged in FIG. 2A and FIG. 2B. Furthermore, limitation to an arrays in FIG. 2A and FIG. 2B is not provided.

Next, a method for producing a two-dimensional image with a wide dynamic range from a light field image which is an aggregate of the macro-pixels 41 and 42 will be described. Herein, by way of example, a case where the lens array 30 has an array with a checkerboard pattern as illustrated in FIG. 2B will be considered.

Figure 3:
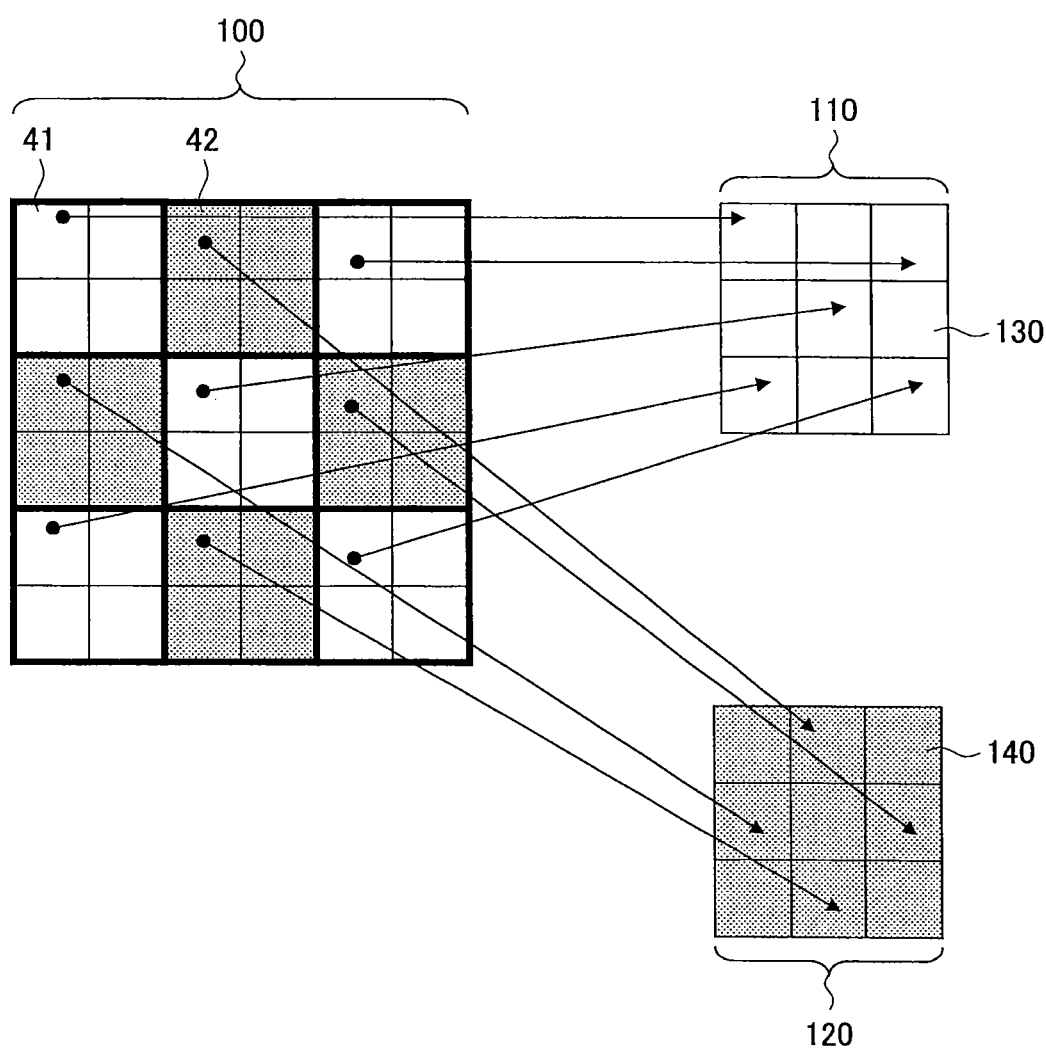
FIG. 3 is a diagram illustrating a macro-pixel group.

FIG. 3 is a diagram illustrating a macro-pixel group. A macro-pixel group 100 as illustrated in FIG. 3 is an illustration provided by extracting three×three macro-pixel groups centered at the macro-pixel 41 which is present directly below the fast lens 31. A white part surrounded by a thick line indicates the macro-pixel 41 and a stain pattern part surrounded by a thick line indicates the macro-pixel 42. In the example of FIG. 3, each of the macro-pixels 41 and 42 is each composed of two horizontal picture elements×two vertical picture elements.

An electric signal from a picture element (light-receiving element) of the macro-pixel 41 which is present directly below the fast lens 31 is rearranged as an arrow in FIG. 3, so that it may be possible to produce a two-dimensional image 110 which may not cause blocked up shadows even for a dark object. Electric signals for picture elements (light-receiving elements) at corresponding positions (left upper ones in the case of FIG. 3) in respective macro-pixels 41 are rearranged like an array of the macro-pixel 41.

Also, a method for rearrangement of the macro-pixel 42 which is present directly below the slow lens 32 is similar, and it may be possible to produce a two-dimensional image 120 which may not cause blown out highlights even for a bright object. Additionally, it may be possible to interpolate an area 130 or 140 with no electric signal which should be rearranged, due to a value of an electric signal of a surrounding thereof.

Furthermore, rearrangement of picture elements (light-receiving elements) at positions other than left upper ones of the macro-pixels 41 and 42 is also similar. In the case of FIG. 3, each of the macro-pixels 41 and 42 is composed of two horizontal picture elements×two vertical picture elements, and hence, it may be possible to produce four two-dimensional images from each of the macro-pixel 41 directly below the fast lens 31 and the macro-pixel 42 directly below the slow lens 32.

Next, a method for calculating (estimating) a distance to an object from a two-dimensional image produced by rearrangement will be described. It may be possible to calculate a distance to an object an amount of an image shift included between two-dimensional images produced from different positions of each macro-pixel.

Additionally, when an object is bright, blown out highlights may be caused in an image for the fast lens 31. It may not be possible to obtain an amount of a shift from an image in which blown out highlights are caused, and hence, such an image in which blown out highlights are caused may be outside a scope of calculation of an amount of a shift. In such a case, however, it may be possible to obtain an image in which blown out highlights are not caused, due to the slow lens 32 adjacent to the fast lens 31, and hence, information for calculating a distance to an object may not lack for such an area.

Similarly, when an object is dark, blocked up shadows may be caused in an image for the slow lens 32. It may not be possible to obtain an amount of a shift from an image in which blocked up shadows are caused, and hence, such an image in which blocked up shadows are caused may be outside a scope of calculation of an amount of a shift. In such a case, however, it may be possible to obtain an image in which blocked up shadows are not caused, due to the fast lens 31 adjacent to the slow lens 32, and hence, information for calculating a distance to an object may not lack for such an area.

Thus, it may be possible to obtain information for calculating a distance to an object with respect to an entire screen even for a scene with a large brightness difference, and hence, it may be possible to measure a distance to an object at a good precision.

Figure 4:
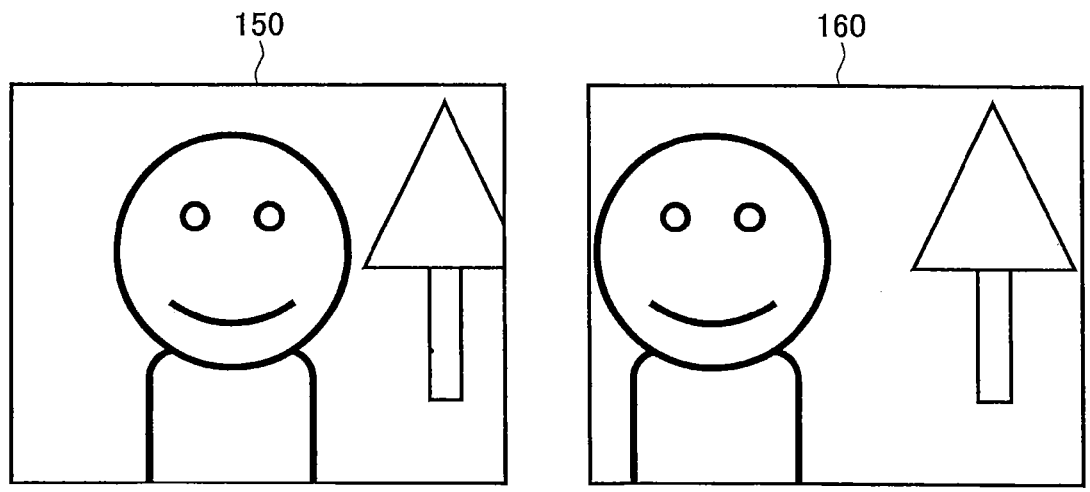
FIG. 4 is a diagram illustrating two-dimensional images including an image shift.

FIG. 4 is a diagram illustrating two-dimensional images including an image shift. A direction of a shift for two-dimensional images 150 and 160 as illustrated in FIG. 4 is a transverse direction, wherein it may be possible to consider that each is a two-dimensional image provided by rearranging left upper and right upper picture elements of the macro-pixel in FIG. 3. Additionally, a shift in a longitudinal direction is provided for a comparison between left upper and left lower ones and a shift in an oblique direction is included for left upper and right lower ones.

It may be possible to obtain, and convert into a distance to an object, an amount of a shift between the two-dimensional image 150 and the two-dimensional image 160 from, for example, image processing such as block matching. A method for obtaining an amount of a shift may not be an essence of an embodiment of the present invention and is not limited to a particular method.

Figure 5:
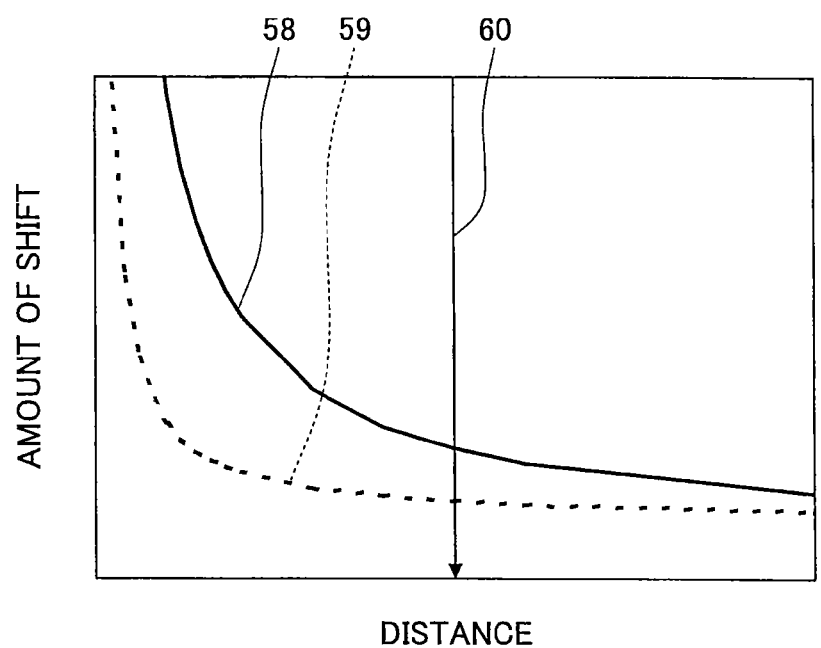
FIG. 5 is a diagram illustrating a relationship between an amount of shift and a distance to an object.

FIG. 5 is a diagram illustrating a relationship between an amount of a shift and a distance to an object. In FIG. 5, a transverse axis is a distance to an object and a longitudinal axis is an amount of a shift. A relationship between an amount of a shift and a distance to an object may generally be an inverse proportion, but may be changed by each parameter of an optical system as illustrated in FIG. 1.

A solid line 58 in FIG. 5 indicates one example of a relationship between a shift of two-dimensional images produced by the macro-pixel 41 directly below the fast lens 31 and such a distance. Furthermore, a dotted line 59 in FIG. 5 indicates one example of a relationship between a shift between two-dimensional images produced by the macro-pixel 42 directly below the slow lens 32 and such a distance.

A distance to an object is calculated from an amount of a shift included between two-dimensional images with no blocked up shadows produced from the macro-pixel 41 directly below the fast lens 31 and the solid line 58. Furthermore, a distance to an object is calculated from an amount of a shift included between two-dimensional images with no blown out highlights produced from the macro-pixel 42 directly below the slow lens 32 and the dotted line 59. Thereby, it may be possible to calculate a distance to an object even for a scene with a large brightness difference.

Figure 6:
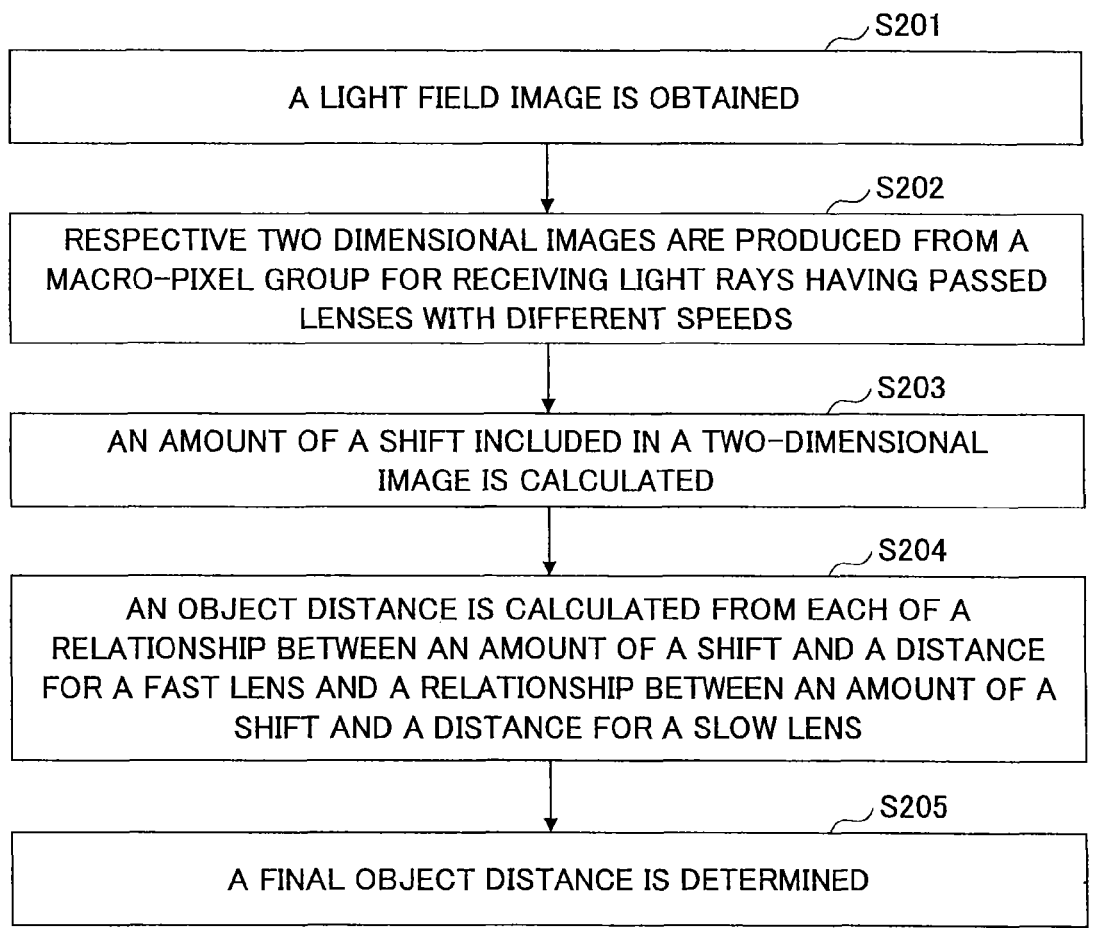
FIG. 6 is an example of a flowchart illustrating a method for calculating a distance to an object.

FIG. 6 is an example of flowchart illustrating a method for calculating a distance to an object. As referring to FIG. 6, first, the distance calculating part 50 obtains a light field image from each picture element of the imaging element array 40 at step S201. Then, the distance calculating part 50 rearranges electric signals from picture elements (light-receiving elements) at corresponding positions (for example, left upper ones) of respective macro-pixels 41 from, for example, the macro-pixel group 100 as illustrated in FIG. 3, like an array of the macro-pixel 41, to produce a two-dimensional image A at step S202. Also, electric signals from picture elements (light-receiving elements) at corresponding positions (for example, right upper ones) of respective macro-pixels 41 are rearranged like an array of the macro-pixel 41 to produce a two-dimensional image B.

Also, electric signals from picture elements (light-receiving elements) at corresponding positions (for example, left upper ones) of respective macro-pixels 42 are rearranged like an array of the macro-pixel 42 to produce a two-dimensional image C. Also, electric signals from picture elements (light-receiving elements) at corresponding positions (for example, right upper ones) of respective macro-pixels 42 are rearranged like an array of the macro-pixel 42 to produce a two-dimensional image D.

Then, the distance calculating part 50 calculates an amount of a shift E included in the two-dimensional image A and two-dimensional image B produced at step S202, at step S203. Also, an amount of a shift F included in the two-dimensional image C and two-dimensional image D produced at step S202 is calculated. Then, the distance calculating part 50 calculates a distance to an object A using the amount of a shift E and a relationship between an amount of a shift and a distance as illustrated in the solid line 58 in FIG. 5 at step S204. Also, a distance to an object B is calculated by using the amount of a shift F and a relationship between an amount of a shift and a distance as illustrated in the dotted line 59 in FIG. 5.

That is, at step S204, the distance measuring part 50 calculates a distance to an object A based on information from the macro-pixel 41 directly below the fast lens 31 and calculates a distance to an object B based on information from the macro-pixel 42 directly below the slow lens 32. However, when an amount of a shift is calculated, an image in which blown out highlights are caused or an image in which blocked up shadows are caused is eliminated as described above, and hence, only one of the distance A and the distance B may be calculated. In such a case (even when blown out highlights or blocked up shadows are caused), it may be possible to calculate a distance to an object based on information from at least one of the fast lens 31 and the slow lens 32 for each area in an entire screen, and hence, it may be possible to calculate a distance to an object at a good precision.

Then, the distance calculating part 50 determines a final distance to an object at step S205. That is, both the distance A and the distance B are calculated at step S204, in a case of an image in which blown out highlights or blocked up shadows are not caused. Therefore, one of the distance A and the distance B is selected so that a selected one is provided as a final distance to an object.

One example of a method of selection for the distance A and the distance B will be described below. It may be possible to find a general distance to an object from the distance A and the distance B obtained at step S204. Herein, an absolute value of a derivative value of an amount of a shift over a distance near a general distance to an object is calculated for each of the solid line 58 and the dotted line 59 in FIG. 5. Then, a distance (the distance A or the distance B) obtained from a relationship with a large absolute value of a derivative value (the solid line 58 or the dotted line 59) is provided as a final distance to an object.

A final distance to an object is determined based on a relationship with a large absolute value of a derivative value (the solid line 58 or the dotted line 59), so that it may be possible to reduce an error in calculation of a distance. For example, an absolute value of a derivative value of an amount of a shift over a distance for the solid line is greater than that of the dotted line 59 near a distance indicated by an arrow 60 in FIG. 5, and hence, it may be preferable to provide a distance A obtained from a relationship of the solid line 58 as a final distance to an object.

Additionally, in practice, it may be possible to, for example, obtain a look-up table or estimated formula corresponding to the solid line 58 preliminarily and calculate a distance by using the look-up table or estimated formula corresponding to the solid line 58 for an amount of a shift obtained from the lens 31 with a large numerical aperture. Also, it may be possible to obtain a look-up table or estimated formula corresponding to the dotted line 59 preliminarily and calculate a distance by using the look-up table or estimated formula corresponding to the dotted line 59 for an amount of a shift obtained from the lens 32 with a small numerical aperture. That is, it may be possible to calculate a distance corresponding to a numerical aperture by using a preliminarily obtained look-up table or estimated formula.

Thus, the distance measuring device 10 according to the first embodiment uses the lens array 30 including the lenses 31 and 32 with different aperture radii. Thereby, a brightness of an image from a dark area to a bright area of a scene may fall within a dynamic range of the imaging element array 40 so that blown out highlights or blocked up shadows of an image may be prevented from occurring. Then, a distance to an object is calculated based on a relationship between an amount of a shift and a distance which corresponds to an aperture radius of each of the lenses 31 and 32 by using an image in which blown out highlights or blocked up shadows are not caused. As a result, it may be possible to measure a distance to an object with respect to an entire screen at a good precision, even for a scene with a large brightness difference.

Figure 7:
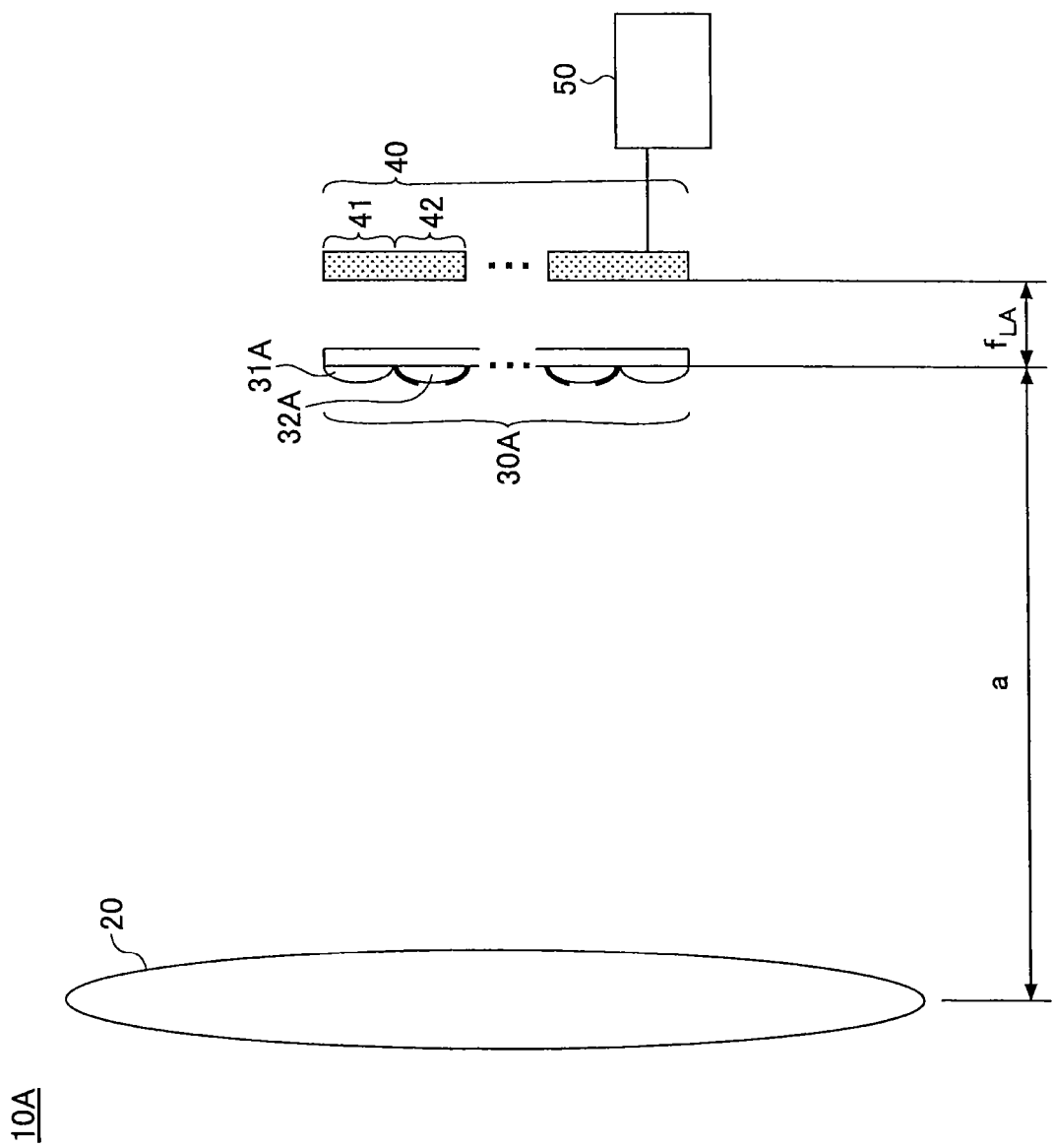
FIG. 7 is a diagram illustrating a distance measuring device according to a variation example of a first embodiment.

Additionally, the lens array 30 having lenses 31 and 32 which are convex-convex lenses being used in the distance measuring device 10 as illustrated in FIG. 1 and FIGS. 2A and 2B has been illustrated as an example, but is not limited thereto. For example, even when a lens array 30A having lenses 31A and 32A which are plano-convex lenses, like a distance measuring device 10A as illustrated in FIG. 7, is used instead of the lens array 30, it may be possible to provide an effect similar to as described above. Additionally, in FIG. 7, it may be possible to provide a focal length, arrangement, etc., of the lens 31A as being similar to those of the lens 31 and it may be possible to provide a focal length, arrangement, etc., of the lens 32A as being similar to those of the lens 32.

A Second Embodiment

In a second embodiment, an example of a lens array composed of plural lenses with different curvatures is illustrated. Additionally, in the second embodiment, a description(s) for a component identical to that of the previously described embodiment(s) will be omitted.

Figure 8:
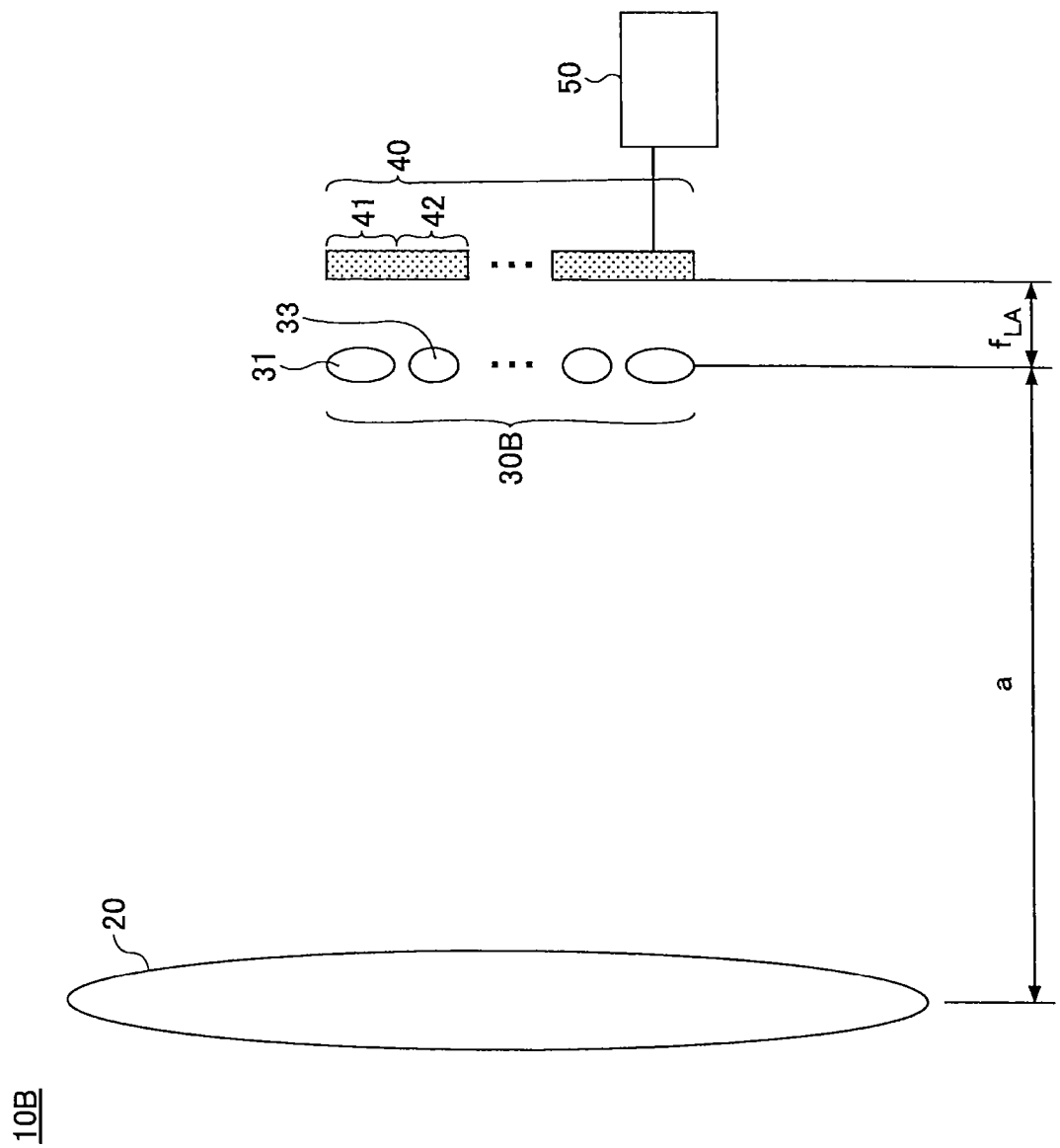
FIG. 8 is a diagram illustrating a distance measuring device according to a second embodiment.

FIG. 8 is a diagram illustrating a distance measuring device according to the second embodiment. As referring to FIG. 8, a distance measuring device 10B is different from the distance measuring device 10 (see FIG. 1) in that the lens array 30 is replaced with a lens array 30B. The lens array 30B has plural lenses with aperture radii which include the lens 31 with a predetermined aperture radius and a lens 33 with an aperture radius smaller than that of the lens 31. The lens 31 and the lens 33 are lenses whose curvatures are changed to provide different numerical apertures. Additionally, the lens 31 is one typical example of a third lens according to an embodiment of the present invention and the lens 33 is one typical example of a fourth lens according to an embodiment of the present invention.

In the distance measuring device 10B, a numerical aperture of the imaging lens 20 and a numerical aperture of the lens 31 constituting the lens array 30B are provided as equal values NAa and a numerical aperture of the lens 33 is provided as a value NAc smaller than NAa. That is, the lens 33 is a lens slower than the lens 31.

Similarly to the first embodiment, an image directly below the fast lens 31 and an image directly below the slow lens 33 will be referred to as the macro-pixel 41 and the macro-pixel 42, respectively, on each imaging element of the imaging element array 40. Similarly to the first embodiment, the macro-pixel 41 is an image provided by the fast lens 31, and hence, blocked up shadows may not be caused even when an object is dark. Also, the macro-pixel 42 is an image provided by the dark lens 33, and hence, blown out highlights may not be caused even when an object is bright, so that it may be possible to obtain an image with a tone.

Figure 9A:
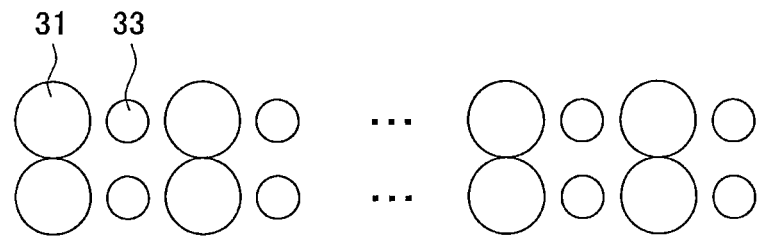
FIG. 9A and FIG. 9B are diagrams illustrating arrangement of a fast lens and a slow lens which constitute a lens array according to a second embodiment.
Figure 9A:
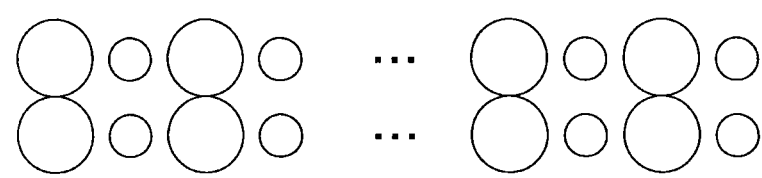
Figure 9B:
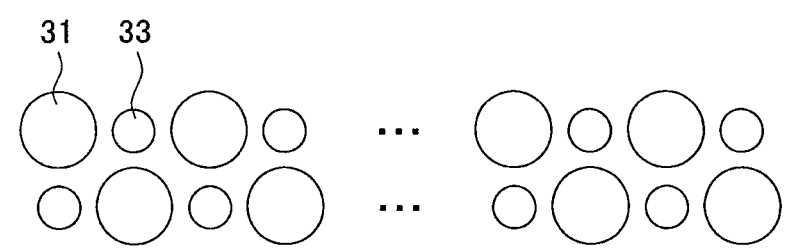
Figure 9B:
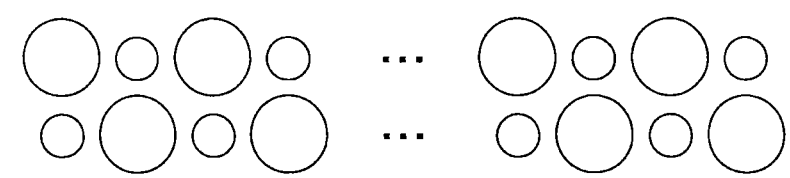

FIG. 9A and FIG. 9B are diagrams illustrating arrangement of fast lenses and slow lenses which constitute a lens array according to the second embodiment, which are diagrams viewed from a direction of incident light. For the lenses 31 and the lenses 33, for example, a sequence of the lenses 31 and a sequence of the lenses 33 may be alternately arrayed as illustrated in FIG. 9A, or the lenses 31 and the lenses 33 may be arrayed in a checkerboard pattern as illustrated in FIG. 9B, similarly to the first embodiment. Of course, a row and a column may be exchanged in FIG. 9A and FIG. 9B. Furthermore, limitation to arrays in FIG. 9A and FIG. 9B is not provided.

A method for producing a two-dimensional image with a wide dynamic range by rearrangement for a light field image of a macro-pixel group is also similar to that of the first embodiment. Furthermore, a method for calculating a distance to an object from a two-dimensional image produced by rearrangement and a method for calculating a distance to an object in a scene with a large brightness difference are also similar to those of the first embodiment.

Thus, it may also possible to provide an effect similar to that of the first embodiment by using a lens array including lenses whose curvatures are changed to provide different numerical apertures.

Figure 10:
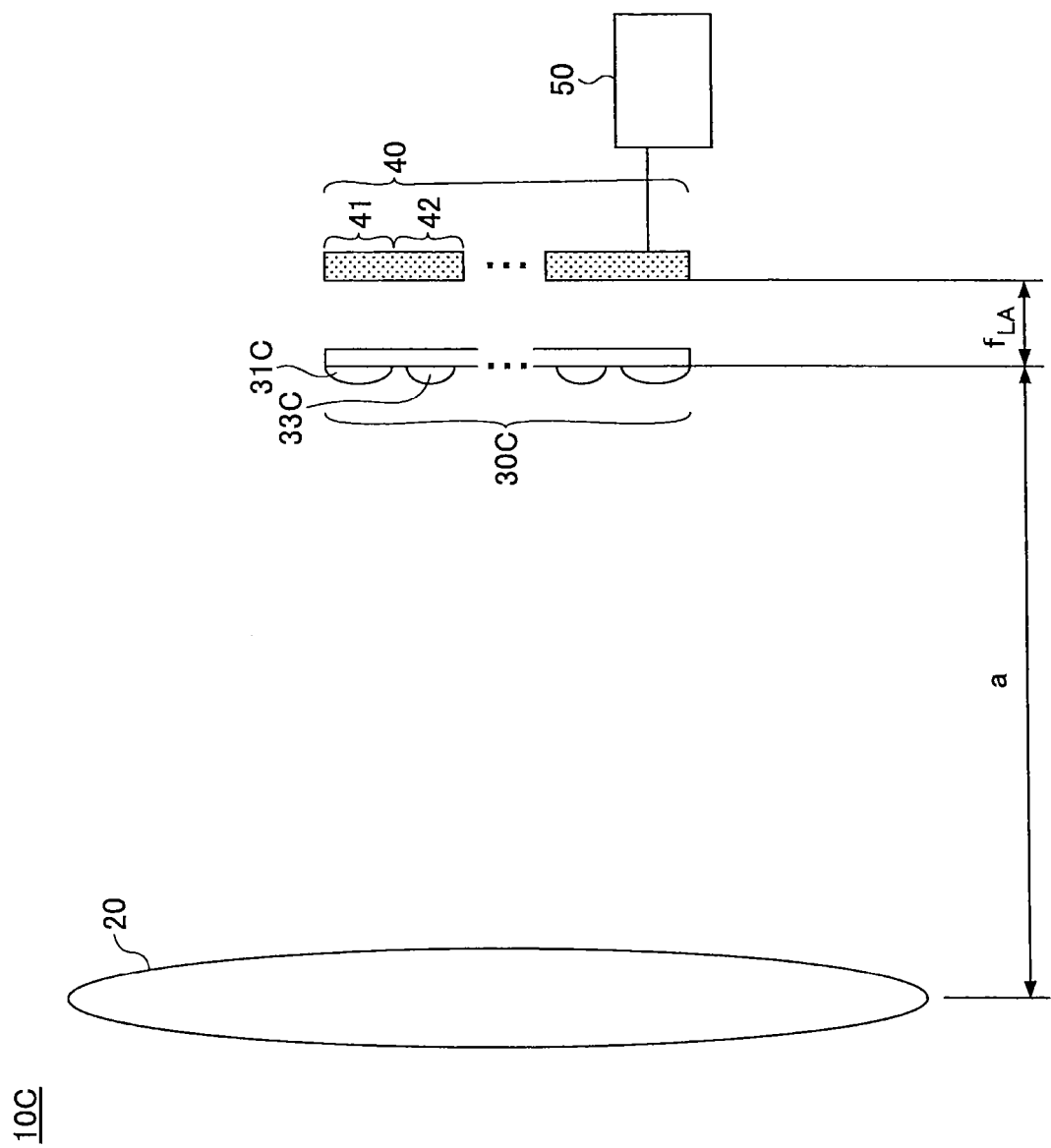
FIG. 10 is a diagram illustrating a distance measuring device according to a variation example of a second embodiment.

Additionally, the lens array 30B having the lenses 31 and 33 which are convex-convex lenses is used in the distance measuring device 10B as illustrated in FIG. 8 and FIGS. 9A and 9B has been illustrated as an example, but is not limited thereto. For example, a lens array 30C having lenses 31C and 33C which are plano-convex lenses, like a distance measuring device 10C as illustrated in FIG. 10, is used instead of the lens array 30B, so that it may also be possible to provide an effect similar to the above. Additionally, in FIG. 10, it may be possible to provide a focal length, arrangement, etc., of the lens 31C as being similar to those of the lens 31 and it may be possible to provide a focal length, arrangement, etc., of the lens 33C as being similar to those of the lens 33.

A Third Embodiment

In a third embodiment, an example of a lens array composed of plural lenses with different refractive indices is illustrated. Additionally, in the third embodiment, a description(s) for a component identical to that of the previously described embodiment(s) will be omitted.

Figure 11:
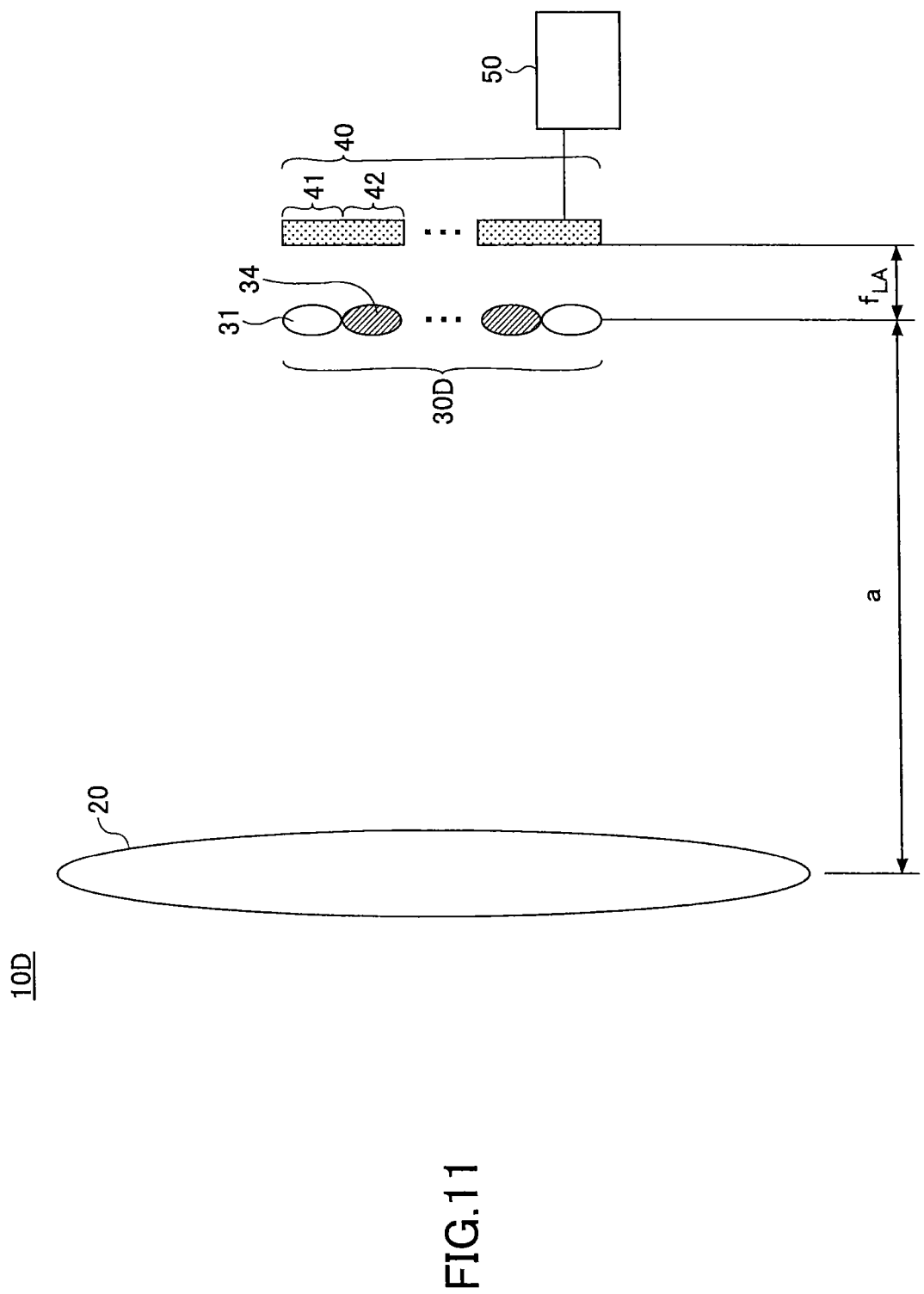
FIG. 11 is a diagram illustrating a distance measuring device according to a third embodiment.

FIG. 11 is a diagram illustrating a distance measuring device according to the third embodiment. As referring to FIG. 11, a distance measuring device 10D is different from the distance measuring device 10 (see FIG. 1) in that the lens array 30 is replaced with a lens array 30D. The lens array 30D has plural lenses with refractive indices which include the lens 31 with a predetermined refractive index and a lens 34 with a refractive index smaller than that of the lens 31. The lens 31 and the lens 34 are lenses whose refractive indices are changed to provide different numerical apertures. Additionally, the lens 31 is one typical example of a fifth lens according to an embodiment of the present invention and the lens 34 is one typical example of a sixth lens according to an embodiment of the present invention.

In the distance measuring device 10D, a numerical aperture of the imaging lens 20 and a numerical aperture of the lens 31 constituting the lens array 30D are provided as equal values NAa and a numerical aperture of the lens 34 is provided as a value NAc smaller than NAa. That is, the lens 34 is a lens slower than the lens 31.

Similarly to the first embodiment, an image directly below the fast lens 31 and an image directly below the slow lens 34 will be referred to as the macro-pixel 41 and the macro-pixel 42, respectively, on each imaging element of the imaging element array 40. Similarly to the first embodiment, the macro-pixel 41 is an image provided by the fast lens 31, and hence, blocked up shadows may not be caused even when an object is dark. Also, the macro-pixel 42 is an image provided by the dark lens 34, and hence, blown out highlights may not be caused even when an object is bright, so that it may be possible to obtain an image with a tone.

Figure 12A:
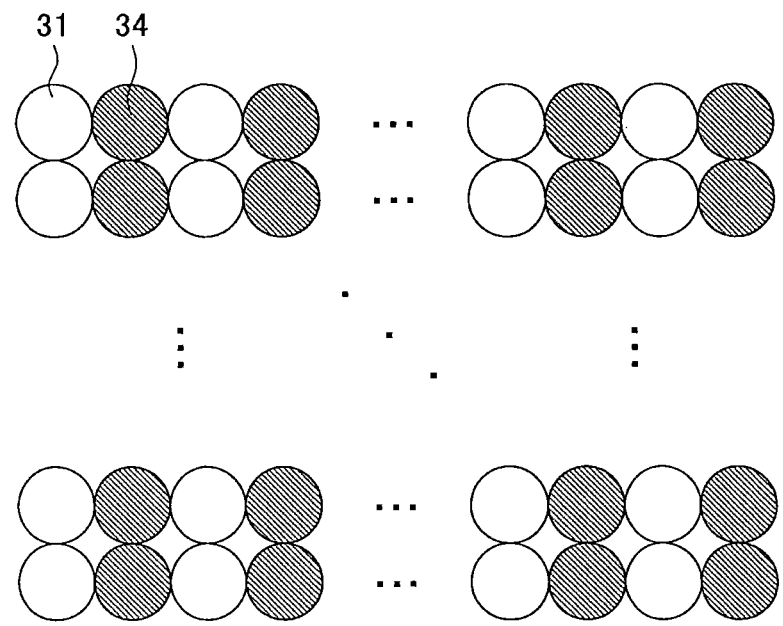
FIG. 12A and FIG. 12B are diagrams illustrating arrangement of a fast lens and a slow lens which constitute a lens array according to a third embodiment.
Figure 12B:
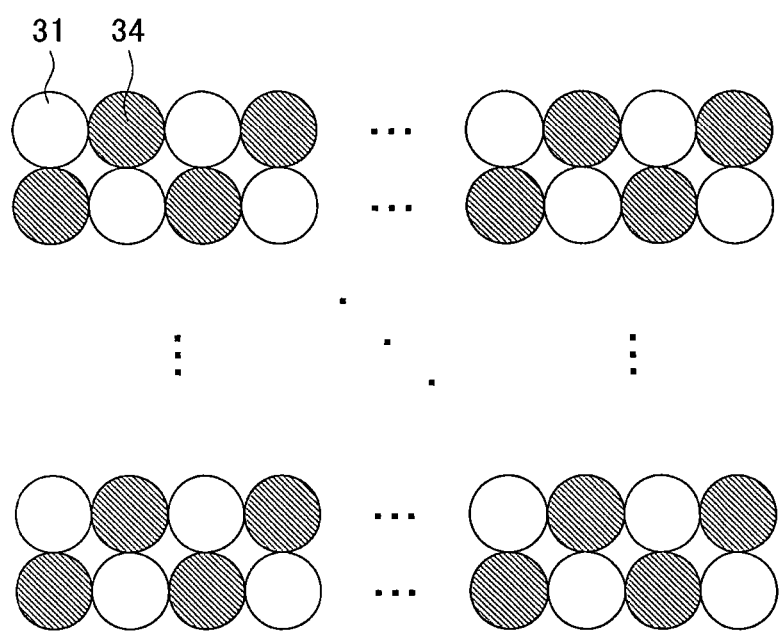

FIG. 12A and FIG. 12B are diagrams illustrating arrangement of fast lenses and slow lenses which constitute a lens array according to the third embodiment, which are diagrams viewed from a direction of incident light. For the lenses 31 and the lenses 34, for example, a sequence of the lenses 31 and a sequence of the lenses 34 may be alternately arrayed as illustrated in FIG. 12A, or the lenses 31 and the lenses 34 may be arrayed in a checkerboard pattern as illustrated in FIG. 12B, similarly to the first embodiment. Of course, a row and a column may be exchanged in FIG. 12A and FIG. 12B. Furthermore, limitation to arrays in FIG. 12A and FIG. 12B is not provided.

A method for producing a two-dimensional image with a wide dynamic range by rearrangement for a light field image of a macro-pixel group is also similar to that of the first embodiment. Furthermore, a method for calculating a distance to an object from a two-dimensional image produced by rearrangement and a method for calculating a distance to an object in a scene with a large brightness difference are also similar to those of the first embodiment.

Thus, it may also possible to provide an effect similar to that of the first embodiment by using a lens array including lenses whose refractive indices are changed to provide different numerical apertures.

Figure 13:
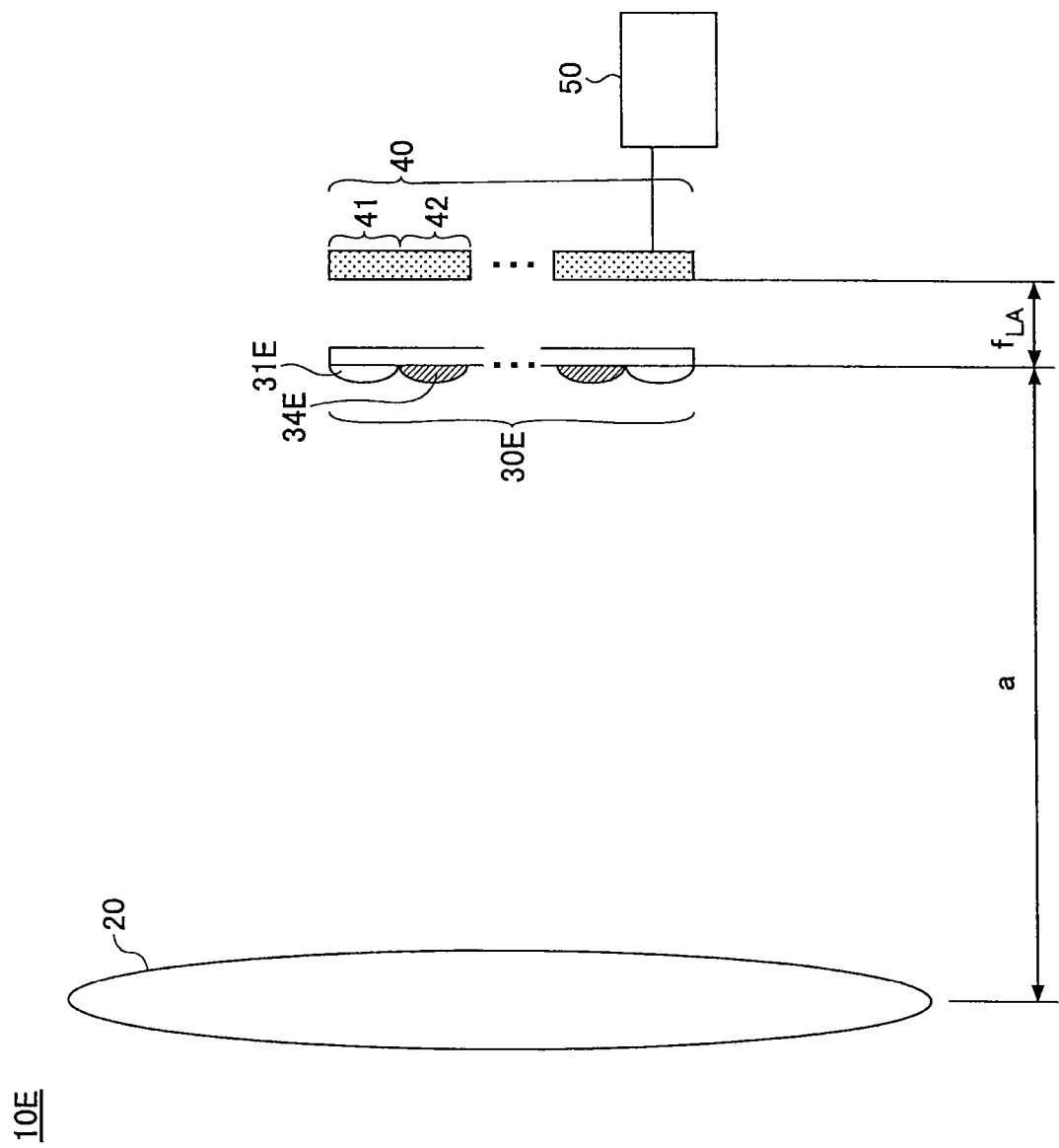
FIG. 13 is a diagram illustrating a distance measuring device according to a variation example of a third embodiment.

Additionally, the lens array 30D having the lenses 31 and 34 which are convex-convex lenses is used in the distance measuring device 10D as illustrated in FIG. 11 and FIGS. 12A and 12B has been illustrated as an example, but is not limited thereto. For example, a lens array 30E having lenses 31E and 34E which are plano-convex lenses, like a distance measuring device 10E as illustrated in FIG. 13, is used instead of the lens array 30D, so that it may also be possible to provide an effect similar to the above. Additionally, in FIG. 13, it may be possible to provide a focal length, arrangement, etc., of the lens 31E as being similar to those of the lens 31 and it may be possible to provide a focal length, arrangement, etc., of the lens 34E as being similar to those of the lens 34.

Although some preferable embodiments have been described in detail above, limitation to the above-mentioned embodiments is not provided, various modifications and substitutions may be applied to the above-mentioned embodiments without departing from the scope recited in what is claimed.

For example, plural lenses included in a lens array may be provided as lenses with different numerical apertures which are provided by changing plural parameters among aperture radii, curvatures, and refractive indices thereof.

APPENDIX

<An Illustrative Embodiment(s) of a Distance Measuring Device and a Distance Measuring Method>

At least one illustrative embodiment of the present invention may relate to at least one of a distance measuring device and distance measuring method for measuring a distance to an object.

An object of at least one illustrative embodiment of the present invention may be to provide a distance measuring device capable of measuring a distance to an object at a good precision even for a scene with a large brightness difference.

At least one illustrative embodiment of the present invention may be a distance measuring device having an imaging lens for condensing incident light from an object, a lens array on which light having passed through the imaging lens is incident, an imaging element array for receiving light having passed through the lens array to output image information, and a distance calculating part for calculating a distance to the object based on the image information, wherein the lens array includes plural lenses with different numeric apertures.

Illustrative Embodiment (1) is a distance measuring device having an imaging lens for condensing incident light from an object, a lens array on which light having passed through the imaging lens is incident, an imaging element array for receiving light having passed through the lens array to output image information, and a distance calculating part for calculating a distance to the object based on the image information, wherein the lens array includes plural lenses with different numeric apertures.

Illustrative Embodiment (2) is the distance measuring device as described in Illustrative Embodiment (1), wherein the plural lenses include a first lens and a second lens whose curvatures are mutually equal and a portion of an aperture part of the second lens is shielded so that a numerical aperture of the second lens is smaller than a numerical aperture of the first lens.

Illustrative Embodiment (3) is the distance measuring device as described in Illustrative Embodiment (1), wherein the plural lenses include a third lens and a fourth lens whose curvatures are changed to provide different numerical apertures thereof.

Illustrative Embodiment (4) is the distance measuring device as described in Illustrative Embodiment (1), wherein the plural lenses include a fifth lens and a sixth lens whose refractive indices are changed to provide different numerical apertures thereof.

Illustrative Embodiment (5) is the distance measuring device as described in Illustrative Embodiment (1), wherein the plural lenses include lenses whose plural parameters among aperture radii, curvatures, and refractive indices, are changed to provide different numerical apertures thereof.

Illustrative Embodiment (6) is the distance measuring device as described in Illustrative Embodiment (2), wherein a portion of an aperture part of the second lens is shielded with an opaque metal film.

Illustrative Embodiment (7) is the distance measuring device as described in any one of Illustrative Embodiments (1) to (6), wherein the distance calculating part calculates a distance corresponding to a numerical aperture by using a look-up table.

Illustrative Embodiment (8) is the distance measuring device as described in any one of Illustrative Embodiments (1) to (6), wherein the distance calculating part calculates a distance corresponding to a numerical aperture by using an estimated formula.

Illustrative Embodiment (9) is a distance measuring method including a step for receiving incident light from an object on an imaging element array via a lens array including plural lenses with different numerical apertures to output image information, and a step for calculating a distance to the object based on the image information.

According to at least one illustrative embodiment of the present invention, it may be possible to provide a distance measuring device capable of measuring a distance to an object at a good precision even for a scene with a large brightness difference.

Although the illustrative embodiments and specific examples of the present invention have been described with reference to the accompanying drawings, the present invention is not limited to any of the illustrative embodiments and specific examples and the illustrative embodiments and specific examples may be altered, modified, or combined without departing from the scope of the present invention.

The present application claims the benefit of priority based on Japanese Patent Application No. 2012-038890 filed on Feb. 24, 2012 and Japanese Patent Application No. 2012-241843 filed on Nov. 1, 2012, the entire contents of which are hereby incorporated by reference herein.

What is claimed is:

1. A distance measuring device comprising:
   an imaging lens that condenses incident light from an object;
   a lens array where light passes through the imaging lens is incident thereon;
   an imaging element array that receives light having passed through the lens array to output image information; and
   a distance calculating circuitry configured to calculate a distance to the object based on the image information,
   wherein the lens array includes plural lenses, the plural lenses include a first lens and a second lens with mutually equal curvatures, the first and second lenses being arranged in a direction orthogonal to a light axis,
   wherein a numerical aperture for the first lens is different from a numerical aperture of the second lens,
   wherein, in each imaging element of the imaging element array, a first macro-pixel is provided directly below the first lens and a second macro-pixel is provided directly below the second lens,
   wherein the distance to the object is calculated based on a brightness difference between images produced by the first macro-pixel and the second macro-pixel,
   wherein the images produced by the first and second macro-pixels are two-dimensional images,
   the distance calculating circuitry is configured to calculate an amount of shift between the images produced by the first and second macro-pixels, and to calculate the distance to the object based on the amount of shift, and
   wherein, when one of the images produced by the first and second macro-pixels includes a blown out highlight or a blocked up shadow, the distance calculating circuitry is configured to calculate the distance to the object using only the other of the images produced by the first and second macro-pixels.

2. The distance measuring device as claimed in claim 1, wherein a portion of an aperture part of the second lens is shielded in such a manner that a numerical aperture of the second lens is smaller than a numerical aperture of the first lens.

3. The distance measuring device as claimed in claim 1, wherein the plural lenses include a fifth lens and sixth lens with refractive indices being changed to provide different numerical apertures thereof.

4. The distance measuring device as claimed in claim 1, wherein the plural lenses include lenses with plural parameters selected from the group consisting of aperture radii and refractive indices being changed to provide different numerical apertures thereof.

5. The distance measuring device as claimed in claim 2, wherein a portion of an aperture part of the second lens is shielded with an opaque metal film.

6. The distance measuring device as claimed in claim 1, wherein the distance calculating circuitry is configured to calculate a distance corresponding to a numerical aperture using a look-up table.

7. The distance measuring device as claimed in claim 1, wherein the distance calculating circuitry is configured to calculate a distance corresponding to a numerical aperture using an estimated formula.

8. A distance measuring method comprising:
   receiving incident light from an object on an imaging element array via a lens array including plural lenses, the plural lenses include a first lens and a second lens with mutually equal curvatures, the first and second lenses being arranged in a direction orthogonal to a light axis, and a numerical aperture for the first lens is different from a numerical aperture of the second lens;
   calculating an amount of shift between the images produced by the first and second macro-pixels; and
   calculating a distance to the object based on the amount of shift,
   wherein, in each imaging element of the imaging element array, a first macro-pixel is provided directly below the first lens and a second macro-pixel is provided directly below the second lens,
   wherein the distance to the object is calculated based on a brightness difference between images produced by the first macro-pixel and the second macro-pixel,
   wherein the images produced by the first and second macro-pixels are two-dimensional images, and
   wherein, when one of the images produced by the first and second macro-pixels includes a blown out highlight or a blocked up shadow, the distance to the object is calculated using only the other of the images produced by the first and second macro-pixels.

9. The distance measuring device as claimed in claim 1, wherein absolute values of differential values of shift amounts near a rough distance to an object to be imaged with respect to a first calculated distance and a second calculated distance so that the distance obtained from a relationship with a greater absolute value of differential value is determined to be a final distance to the object to be imaged.

10. A distance measuring device comprising:
an imaging lens that condenses incident light from an object;
a lens array where light passes through the imaging lens is incident thereon;
an imaging element array that receives light having passed through the lens array to output image information; and
a distance calculating circuitry configured to calculate a distance to the object based on the image information,
wherein the lens array includes plural lenses, the plural lenses include a first lens and a second lens with mutually equal curvatures, the first and second lenses being arranged in a direction orthogonal to a light axis,
wherein a numerical aperture for the first lens is different from a numerical aperture of the second lens,
wherein the plural lenses include lenses with plural parameters selected from the group consisting of aperture radii and refractive indices being changed to provide different numerical apertures thereof,
wherein, in each imaging element of the imaging element array, a first macro-pixel is provided directly below the first lens and a second macro-pixel is provided directly below the second lens,
wherein the distance to the object is calculated based on a brightness difference between images produced by the first macro-pixel and the second macro-pixel,
wherein the distance calculating circuitry is configured to calculate a distance corresponding to a numerical aperture using a look-up table,
wherein the distance to be calculated by the distance calculation circuitry is calculated based on an amount of shift between images due to the brightness difference,
wherein the distance to be calculated by the distance calculation circuitry uses the look-up table or an estimated formula,
wherein the look-up table or the estimated formula indicate a relationship between the amount of shift and the distance,
wherein the images produced by the first and second macro-pixels are two-dimensional images,
the distance calculating circuitry is configured to calculate an amount of shift between the images produced by the first and second macro-pixels, and to calculate the distance to the object based on the amount of shift, and
wherein, when one of the images produced by the first and second macro-pixels includes a blown out highlight or a blocked up shadow, the distance calculating circuitry is configured to calculate the distance to the object using only the other of the images produced by the first and second macro-pixels.

* * * * *